United States Patent
Chen et al.

(10) Patent No.: US 12,507,968 B2
(45) Date of Patent: Dec. 30, 2025

(54) METHOD FOR VERTICALLY POSITIONING EXAMINEE, APPRATUS FOR VERTICALLY POSITIONING EXAMINEE, AND CT SYSTEM

(71) Applicant: Siemens Shanghai Medical Equipment Ltd., Shanghai (CN)

(72) Inventors: Kai Chen, Shanghai (CN); Jing Lu, Shanghai (CN); Yi Tian, Shanghai (CN)

(73) Assignee: Siemens Shanghai Medical Equipment Ltd., Shanghai (CN)

( * ) Notice: Subject to any disclaimer, the term of this patent is extended or adjusted under 35 U.S.C. 154(b) by 117 days.

(21) Appl. No.: 18/574,618

(22) PCT Filed: Sep. 15, 2021

(86) PCT No.: PCT/CN2021/118503
§ 371 (c)(1),
(2) Date: Dec. 27, 2023

(87) PCT Pub. No.: WO2023/272950
PCT Pub. Date: Jan. 5, 2023

(65) Prior Publication Data
US 2024/0293091 A1    Sep. 5, 2024

(30) Foreign Application Priority Data
Jun. 28, 2021   (CN) .......................... 202110719036.5

(51) Int. Cl.
A61B 6/00    (2024.01)
A61B 6/04    (2006.01)

(52) U.S. Cl.
CPC ............ *A61B 6/0407* (2013.01); *A61B 6/488* (2013.01); *A61B 6/547* (2013.01)

(58) Field of Classification Search
CPC ....... A61B 6/032; A61B 6/547; A61B 6/0407; A61B 6/0487; A61B 6/488
See application file for complete search history.

(56) References Cited

U.S. PATENT DOCUMENTS

| | | |
|---|---|---|
| 2009/0285357 A1 | 11/2009 | Khamene et al. |
| 2014/0210468 A1 | 7/2014 | Xu |

(Continued)

FOREIGN PATENT DOCUMENTS

| | | |
|---|---|---|
| CN | 203736217 U | 7/2014 |
| CN | 110916700 A | 3/2020 |

(Continued)

OTHER PUBLICATIONS

English translation JP2014108111 (Year: 2014).*
Mar. 4, 2022 (PCT) International Search Report and Written Opinion—App. PCT/CN2021/118503.

*Primary Examiner* — Dani Fox
(74) *Attorney, Agent, or Firm* — Banner & Witcoff, Ltd.

(57) ABSTRACT

A method for vertically positioning an examinee may include obtaining a position of an examination table after placement of an examinee is completed; determining a measurement range that is corresponding to a to-be-examined organ and that is on the examination table; during movement of the examination table toward a scanner gantry, causing the sensor to start to measure a distance to the examinee and obtaining a height of the examination table while the sensor performs measurement; calculating an organ center height (e.g., average height) based on a measurement result of the sensor, the height of the sensor, and the height of the examination table; and adjusting the height of the examination table based on the organ center height, so that the adjusted organ center height is equal to the isocenter height of the scanner gantry to minimize a radiation dose and improve CT imaging quality.

22 Claims, 10 Drawing Sheets

(a)

(b)

(56) References Cited

U.S. PATENT DOCUMENTS

2017/0311842 A1   11/2017  Boettger et al.
2020/0258243 A1    8/2020  Chang et al.
2020/0390406 A1   12/2020  Xu et al.

FOREIGN PATENT DOCUMENTS

| | | |
|---|---|---|
| CN | 112450956 A | 3/2021 |
| DE | 102014219666 A1 | 3/2016 |
| EP | 3171125 A1 | 5/2017 |
| EP | 3693926 A2 | 8/2020 |
| JP | 2001153955 A | 6/2001 |
| JP | 2014108111 A * | 6/2014 |

* cited by examiner (a)

(b)

(a)

(b)

(c)

METHOD FOR VERTICALLY POSITIONING EXAMINEE, APPRATUS FOR VERTICALLY POSITIONING EXAMINEE, AND CT SYSTEM

CROSS REFERENCE TO RELATED APPLICATIONS

This patent application is a U.S. National Stage Application of International Application No. PCT/CN2021/118503, filed Sep. 15, 2021, which claims priority to Chinese Patent Application No. 202110719036.5, filed Jun. 28, 2021, each of which is incorporated herein by reference in its entirety.

TECHNICAL FIELD

This application relates to positioning of an examinee, and specifically to vertical positioning of the examinee before medical examination is performed on the examinee by using a medical imaging device.

BACKGROUND

Before medical examination is performed on an examinee by using a medical imaging device (e.g., a computed tomography (CT)), the examinee needs to be placed so that the examinee maintains a proper position and posture on an examination table of the medical imaging device for proper medical examination.

CT scanning is divided into topography (TOPO) scanning and tomography (TOMO) scanning. Generally, topo scanning is first performed on the examinee at a low radiation dose to generate a topo image, where the topo image is used to determine a precise tomography scanning range of tomography scanning. Then tomography scanning is performed on the examinee at a high radiation dose to generate a tomography image. In a CT scanning workflow, before topo scanning is performed, the examinee is placed on the examination table to fix the position of the examinee on the examination table, and the center of a to-be-examined organ of the examinee is made close to the isocenter of a CT scanner gantry in the vertical direction. The examination table is then moved horizontally so that the examinee reaches a topo scanning start position (i.e., a horizontal start point of the to-be-examined organ of the examinee reaches the horizontal isocenter of the CT scanner gantry). Then, topo scanning is started on the examinee.

Recent several studies have shown that position misalignment in the vertical direction between the center of the to-be-examined organ and the isocenter of the CT scanner gantry affect the radiation dose to the examinee and image quality. However, one study found that almost 95% of examinees undergoing chest CT were inappropriately positioned vertically and that the average deviation distance between the center of the to-be-examined organ and the isocenter of the CT scanner gantries was 33 mm. Therefore, the center of the to-be-examined organ of the examinee needs to be as close to the isocenter of the CT scanner gantry as possible in the vertical direction, so as to minimize the radiation dose to the examinee and improve CT imaging quality.

Currently, a technician uses a laser-assisted system to visually estimate a proper position of an examinee for vertical positioning. That is, a laser source is used to emit a plurality of visible lasers (for example, red lasers) toward the isocenter of the CT scanner gantry to mark the isocenter position of the CT scanner gantry. The technician then manually adjusts the height of the examination table, so that the center of the to-be-examined organ of the examinee overlaps with the isocenter in the vertical direction. However, this requires full attention by the technician during the operation, because the vertical positioning precision of the examinee depends on the operation precision of the technician. It also requires the technician to have expertise to know the best table height for patients of different sizes under different organ scanning solutions. Some technicians may need to adjust the height for several times to obtain a better vertical position, which results in inefficient clinical workflows.

Therefore, a technical solution based on a 3D camera (combined with time-of-flight, structural light, binocular camera, etc.) is proposed to solve this imprecise and inefficient vertical positioning problem. In this solution, a depth map of an object is obtained by using the three-dimensional camera, so as to calculate thickness of an examinee. Along with other functions, the 3D camera can provide more functions, but due to high costs, an alternative cost-effective solution is still needed for low-end scanners. In addition, the current 3D camera needs to be installed on the ceiling of a scanning room, so as to ensure that the entire body of the examinee can be photographed when the examinee is lying on the examination table. However, due to differences of scanning rooms, additional installation and adjustment procedures may be required on site.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
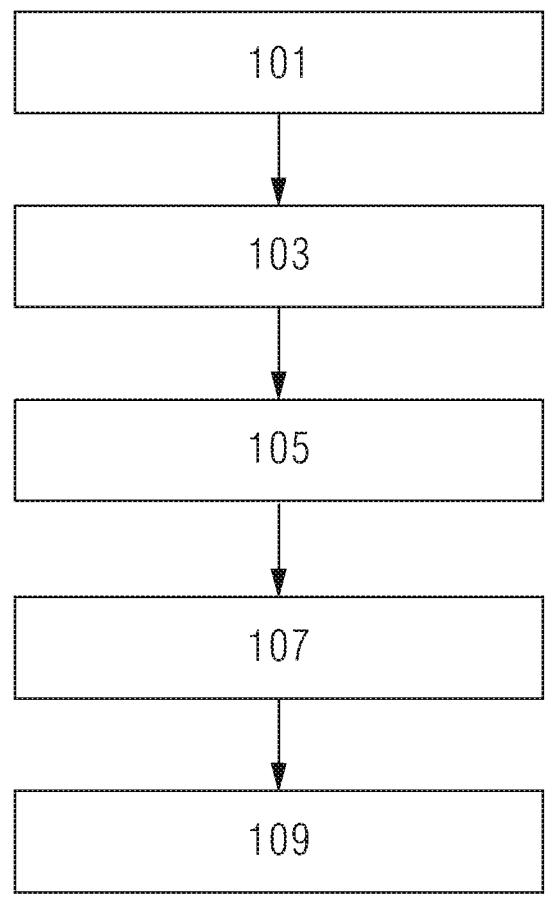
FIG. 1 is a flowchart of a method for vertically positioning an examinee according to an exemplary embodiment of the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the disclosure is to provide a method for vertically positioning an examinee, an apparatus for vertically positioning an examinee, and a CT system, so as to resolve a problem in the prior art that it is difficult to simply and economically perform high-precision vertical positioning on an examinee for which medical imaging examination is to be performed.

To achieve the foregoing objective, according to an aspect of this application, a method for vertically positioning an examinee on a CT device is provided, where a sensor for measuring a distance to the examinee is attached to the CT device, and the method includes: obtaining an initial position of an examination table of the CT device when horizontal placement of the examinee is completed; obtaining a measurement range of the sensor that is corresponding to a to-be-examined organ of the examinee and that is on the examination table, where the measurement range includes a start point and an end point in the horizontal direction; during movement of the examination table toward a scanner gantry of the CT device, when the start point reaches a measurement position of the sensor, causing the sensor to start measurement, and when the end point reaches the measurement position, stopping measurement of the sensor, and obtaining a real-time height of the examination table corresponding to the measurement range while the sensor performs measurement; calculating an organ center height based on a measurement result of the distance to the examinee by the sensor, the height of the sensor, and the real-time height of the examination table corresponding to the measurement range, where the organ center height represents an average height of the center of the to-be-examined organ corresponding to the measurement range in the vertical direction; and adjusting the height of the examination table based on the calculated organ center height, so that the adjusted organ center height is equal to the isocenter height of the scanner gantry.

In this manner, the vertical height of the examinee can be adjusted by using the sensor, so that the adjusted organ center height of the examinee is equal to the isocenter height of the scanner gantry. Thus, the radiation dose to the examinee is minimized and CT imaging quality is improved.

Further, according to an embodiment of this application, the calculating an organ center height includes: calculating average organ thickness of the examinee corresponding to the measurement range based on the measurement result of the sensor, the height of the sensor, and the real-time height of the examination table corresponding to the measurement range, and calculating the organ center height based on the average organ thickness and the current height of the examination table.

In this manner, the average height of the current organ center point may be obtained by calculating the average organ thickness corresponding to the measurement range. For example, the organ center height is equal to the sum of a half of the average organ thickness and the current height of the examination table.

Further, according to an embodiment of this application, the obtaining a measurement range of the sensor that is corresponding to a to-be-examined organ of the examinee and that is on the examination table includes: obtaining a top-view image of the examinee from a camera; determining an image range corresponding to the to-be-examined organ from the top-view image, where the image range is defined by pixel start coordinates and pixel end coordinates in the horizontal direction; mapping the pixel start coordinates to an initial position of the start point of the examination table based on an imaging parameter of the camera and the initial position of the examination table, and mapping the pixel end coordinates to an initial position of the end point of the examination table; and determining the measurement range from the start point and the end point.

In this manner, a precise measurement range may be obtained by using the camera, so that vertical positioning adjustment of the examinee can be completed before topo scanning, so that topo scanning and tomography scanning are performed at an optimized vertical position, thereby minimizing the radiation dose to the examinee and maximizing CT imaging quality.

Further, according to an embodiment of this application, the calculating an organ center height based on a measurement result of the sensor, the height of the sensor, and the real-time height of the examination table corresponding to the measurement range includes: obtaining a distance profile curve from the measurement result of the sensor, where the distance profile curve indicates a distance from the sensor to the examinee corresponding to each point in the measurement range; and calculating the organ center height corresponding to the measurement range based on the distance profile curve, the height of the sensor, and the real-time height of the examination table corresponding to the measurement range.

In this manner, the distance profile curve corresponding to the measurement range may be obtained by using the sensor, and the average organ thickness corresponding to the measurement range may be further calculated from the distance profile curve, the height of the sensor, and the real-time height of the examination table corresponding to the measurement range, so that the organ center height can be obtained.

Further, according to an embodiment of this application, the obtaining a measurement range of the sensor that is corresponding to a to-be-examined organ of the examinee and that is on the examination table includes: obtaining a topo scanning range of topo scanning of the CT device, where the topo scanning range is determined by the CT device for the to-be-examined organ, and the topo scanning range includes a scanning start point and a scanning end point of the examination table in the horizontal direction; and determining the measurement range based on the obtained topo scanning range.

In this manner, the measurement range may be directly determined by using the topo scanning range determined by the CT device, so as to avoid using an additional camera, thereby simplifying determining of the measurement range and simplifying construction of the CT system for vertically positioning the examinee.

Further, according to an embodiment of this application, the determining the measurement range based on the obtained topo scanning range includes: determining the start point and the end point of the measurement range based on the scanning start point of the topo scanning range.

In this manner, the measurement range of the sensor can be obtained by determining the start point and the end point of the measurement range by using the scanning start point of the topo scanning range.

Further, according to an embodiment of this application, a distance between the start point and the end point is equal to a distance between the sensor and the isocenter of the scanner gantry in the horizontal direction.

In this manner, measurement of the sensor exactly ends when the examinee moves to the tomography scanning start position. That is, measurement of the sensor may be performed during movement of the examination table to the topo scanning start position for performing topo scanning, thereby avoiding additional movement of the examination table and simplifying the measurement process of the sensor.

Further, according to an embodiment of this application, the calculating an organ center height based on a measurement result of the sensor, the height of the sensor, and the real-time height of the examination table corresponding to the measurement range includes: obtaining a distance profile curve based on the measurement result of the sensor, where the distance profile curve indicates a distance from the sensor to the examinee corresponding to each point in the measurement range; determining a calculation range corresponding to the to-be-examined organ based on the distance profile curve, where the calculation range is within the measurement range; determining an updated profile curve based on the calculation range, where the updated profile curve indicates a distance from the sensor to the examinee corresponding to each point in the calculation range; and calculating the organ center height corresponding to the measurement range based on the updated profile curve, the height of the sensor, and the real-time height of the examination table corresponding to the calculation range within the measurement range.

In this manner, a calculation range of relatively high precision corresponding to the to-be-examined organ may be determined according to a measurement range of low precision, so that the organ center height is calculated with high precision. In this way, even when a camera is not used, high-precision adjustment of a vertical position of the examinee can be implemented.

Further, according to an embodiment of this application, the determining the measurement range based on the obtained topo scanning range includes: determining the start point of the measurement range based on the scanning start point of the topo scanning range, and determining the end point of the measurement range based on the scanning end point of the topo scanning range, where the measurement range includes the topo scanning range.

In this manner, measurement of the sensor may be performed simultaneously with topo scanning, thereby avoiding additional movement of the examination table. In addition, measurement of the sensor is completed at the completion of topo scanning, so as to avoid spending additional time on measurement of the sensor in the CT workflow, so that measurement of the sensor is implemented without affecting the CT workflow. Therefore, the method for vertically positioning an examinee is more easily implemented on the CT device.

Further, according to an embodiment of this application, the calculating an organ center height based on a measurement result of the sensor, the height of the sensor, and the real-time height of the examination table corresponding to the measurement range includes: obtaining a distance profile curve based on the measurement result of the sensor, where the distance profile curve indicates a distance from the sensor to the examinee corresponding to each point in the measurement range; obtaining a calculation range from the CT device, where the calculation range is a tomography scanning range in the horizontal direction determined by the CT device, and the tomography scanning range is determined by the CT device from a topo image generated by the topo scanning and is within the topo scanning range; determining an updated profile curve based on the calculation range from the distance profile curve, where the updated profile curve indicates a distance from the sensor to the examinee corresponding to each point in the calculation range; and calculating the organ center height corresponding to the measurement range based on the updated profile curve, the height of the sensor, and the real-time height of the examination table corresponding to the calculation range within the measurement range.

In this manner, by using the tomography scanning range determined by the CT device as a calculation range for high-precision calculation, not only high-precision calculation of the organ center height and high-precision adjustment of the vertical height of the examinee can be implemented, but also additional processing of the measurement range is avoided, thereby simplifying the process of adjusting the vertical height of the examinee.

According to another aspect of the present application, an apparatus for vertically positioning an examinee on a CT device is further provided and includes: an obtaining module, configured to: obtain an initial position of an examination table of the CT device from the CT device when horizontal placement of the examinee is completed; and obtain a measurement range that is corresponding to a to-be-examined organ of the examinee and that is on the examination table, where the measurement range includes a start point and an end point in the horizontal direction; a sensor, attached to a scanner gantry of the CT device, where a signal transmission direction of the sensor intersects an isocenter axis of the scanner gantry frame, and the sensor is configured to: during movement of the examination table toward the scanner gantry, when the start point reaches a measurement position of the sensor, start to measure the distance to the examinee, and when the end point reaches the measurement position, stop measurement, where the obtaining module is further configured to obtain a real-time height of the examination table corresponding to the measurement range while the sensor performs measurement; a calculation module, configured to calculate an organ center height based on a measurement result of the sensor, the height of the sensor, and the real-time height of the examination table corresponding to the measurement range, where the organ center height represents an average height of the center of the to-be-examined organ corresponding to the measurement range in the vertical direction; and an adjustment module, configured to adjust the height of the examination table based on the calculated organ center height, so that the adjusted organ center height is equal to the isocenter height of the scanner gantry.

In this manner, the vertical height of the examinee can be adjusted by using the sensor, so that the adjusted organ center height is equal to the isocenter height of the scanner gantry. Thus, the radiation dose to the examinee is minimized and CT imaging quality is improved.

Further, according to an embodiment of this application, the calculating an organ center height includes: calculating average organ thickness of the examinee corresponding to the measurement range based on the measurement result of the sensor, the height of the sensor, and the real-time height of the examination table corresponding to the measurement range, and calculating the organ center height based on the average organ thickness and the current height of the examination table.

In this manner, the average height of the current organ center point may be obtained by calculating the average organ thickness corresponding to the measurement range. For example, the organ center height is equal to the sum of a half of the average organ thickness and the current height of the examination table.

Further, according to an embodiment of this application, the apparatus for vertically positioning an examinee further includes a camera, configured to shoot a top-view image of the examinee when horizontal placement of the examinee is completed; and the obtaining module is further configured to: obtain the top-view image and determine an image range corresponding to the to-be-examined organ from the top-view image, where the image range is defined by pixel start coordinates and pixel end coordinates in the horizontal direction; map the pixel start coordinates to an initial position of the start point of the examination table based on an imaging parameter of the camera and the initial position of the examination table, and map the pixel end coordinates to an initial position of the end point of the examination table; and determine the measurement range from the start point and the end point.

In this manner, a precise measurement range may be obtained by using the camera, so that vertical positioning adjustment of the examinee can be completed before topo scanning, so that topo scanning and tomography scanning are performed at an optimized vertical position, thereby minimizing the radiation dose to the examinee and maximizing CT imaging quality.

Further, according to an embodiment of this application, the calculation module is further configured to: determine a distance profile curve based on the measurement result of the sensor, where the distance profile curve indicates a distance from the sensor to the examinee corresponding to each point in the measurement range; and calculate the organ center height corresponding to the measurement range based on the distance profile curve, the height of the sensor, and the real-time height of the examination table corresponding to the measurement range.

In this manner, the distance profile curve corresponding to the measurement range may be obtained by using the sensor, and the average organ thickness corresponding to the measurement range may be further calculated from the distance profile curve, the height of the sensor, and the real-time height of the examination table corresponding to the measurement range, so that the organ center height can be obtained.

Further, according to an embodiment of this application, the obtaining module is further configured to: obtain a topo scanning range of topo scanning from the CT device, where the topo scanning range is determined by the CT device for the to-be-examined organ, and the topo scanning range includes a scanning start point and a scanning end point of the examination table in the horizontal direction; and determine the measurement range based on the obtained topo scanning range.

In this manner, the measurement range may be directly determined by using the topo scanning range determined by the CT device, so as to avoid using an additional camera, thereby simplifying determining of the measurement range and simplifying construction of the CT system for vertically positioning the examinee.

Further, according to an embodiment of this application, the determining the measurement range based on the obtained topo scanning range includes: determining the start point and the end point of the measurement range based on the scanning start point of the topo scanning range.

In this manner, the measurement range of the sensor can be obtained by determining the start point and the end point of the measurement range by using the scanning start point of the topo scanning range.

Further, according to an embodiment of this application, a distance between the start point and the end point is equal to a distance between the sensor and the isocenter of the scanner gantry in the horizontal direction.

In this manner, measurement of the sensor exactly ends when the examinee moves to the tomography scanning start position. That is, measurement of the sensor may be performed during movement of the examination table to the topo scanning start position for performing topo scanning, thereby avoiding additional movement of the examination table and simplifying the measurement process of the sensor.

Further, according to an embodiment of this application, the calculation module is further configured to: determine a distance profile curve from the measurement result of the sensor, where the distance profile curve indicates a distance from the sensor to the examinee corresponding to each point in the measurement range; determine a calculation range corresponding to the to-be-examined organ based on the distance profile curve, where the calculation range is within the measurement range; determine an updated profile curve based on the calculation range, where the updated profile curve indicates a distance from the sensor to the examinee corresponding to each point in the calculation range; and calculate the organ center height corresponding to the measurement range based on the updated profile curve, the height of the sensor, and the real-time height of the examination table corresponding to the calculation range within the measurement range.

In this manner, a calculation range of relatively high precision corresponding to the to-be-examined organ may be determined according to a measurement range of low precision, so that the organ center height is calculated with high precision. In this way, even when a camera is not used, high-precision adjustment of a vertical position of the examinee can be implemented.

Further, according to an embodiment of this application, the obtaining module is further configured to: determine the start point of the measurement range based on the scanning start point of the topo scanning range, and determine the end point of the measurement range based on the scanning end point of the topo scanning range, where the measurement range includes the topo scanning range.

In this manner, measurement of the sensor may be performed simultaneously with topo scanning, thereby avoiding additional movement of the examination table and simplifying the measurement process of the sensor.

Further, according to an embodiment of this application, the obtaining module is further configured to obtain a calculation range from the CT device, where the calculation range is a tomography scanning range in the horizontal direction determined by the CT device, and the tomography scanning range is determined by the CT device from a topo image generated by the topo scanning and is within the topo scanning range; and the calculation module is further configured to: determine a distance profile curve from the measurement result of the sensor, where the distance profile curve indicates a distance from the sensor to the examinee corresponding to each point in the measurement range; determine an updated profile curve based on the calculation range from the distance profile curve, where the updated profile curve indicates a distance from the sensor to the examinee corresponding to each point in the calculation range; and calculate the organ center height corresponding to the measurement range based on the updated profile curve, the height of the sensor, and the real-time height of the examination table corresponding to the calculation range within the measurement range.

In this manner, by using the tomography scanning range determined by the CT device as a calculation range for high-precision calculation, not only high-precision calculation of the organ center height and high-precision adjustment of the vertical height of the examinee can be implemented, but also additional processing of the measurement range is avoided, thereby simplifying the process of adjusting the vertical height of the examinee.

Further, according to an embodiment of this application, the sensor includes a single sensor unit or an array including a plurality of sensor units.

In this manner, a single sensor unit or an array including a plurality of sensor units may be selected for distance measurement according to an adjustment precision requirement. For example, a single time-of-flight sensor may be used for point-to-point measurement, or an array including a plurality of time-of-flight sensors may be used for row-by-row or segment-by-segment measurement.

According to another aspect of this application, a CT system is further provided, including: the foregoing apparatus for vertically positioning an examinee and a CT device, including: an examination table capable of moving vertically under control of the apparatus for vertically positioning an examinee; and a scanner gantry, configured to perform topo scanning or tomography scanning on a examinee in the scanner gantry, where a sensor of the apparatus for vertically positioning an examinee is attached to the scanner gantry, and a signal transmission direction of the sensor intersects an isocenter axis of the scanner gantry.

In this manner, in the CT system, a vertical height of the examinee can be adjusted with high precision, thereby minimizing the radiation dose to the examinee and improving CT imaging quality. In addition, according to the CT system of this application, the examinee may be automatically positioned vertically without manual operation by an operator, thereby greatly improving efficiency of a clinical workflow. In particular, in the case of multi-part scanning, a corresponding height of the examinee is automatically adjusted for each part, so that the radiation dose to the examinee is reduced while an extension of operating time of the CT system is avoided. In addition, the CT system integrates sensors with scanner gantries, and is easier to install and maintain than a traditional 3D camera-based solution. In addition, by combining sensor-based vertical automatic positioning with RGB camera-based horizontal automatic positioning, a fully automated positioning system can be provided for entry-level CT products with low costs.

In the embodiments of this application, a sensor is disposed, and a vertical distance to an examinee is measured by using the sensor during movement of an examination table, so that an average height of the center of a to-be-examined organ in the vertical direction is measured by using a plurality of vertical distances corresponding to the to-be-examined organ, and a height of the examination table is adjusted so that the adjusted organ center height is equal to an isocenter height of a scanner gantry, so as to at least resolve a problem in the prior art that it is difficult to perform high-precision vertical positioning on the examinee without affecting CT working efficiency, thereby implementing an effect of minimizing the radiation dose to the examinee and improving CT imaging quality without affecting CT working efficiency.

It should be noted that the embodiments in this application and the features in the embodiments may be combined with each other in case of no conflicts. This application is described in detail below with reference to the drawings and the embodiments.

It should be noted that, unless otherwise specified, all technical and scientific terms used herein have the same meaning as commonly understood by a person of ordinary skill in the art to which this application belongs.

In this application, unless otherwise specified, orientation terms such as "upper", "lower", "top", and "bottom" are generally used based on a direction shown in the accompanying drawings, or generally defined based on a component on a vertical, perpendicular, or gravity direction; and similarly, for ease of understanding and description, "inside and outside" refer to inside and outside relative to a profile of a component. However, the foregoing orientation terms are not intended to limit this application.

FIG. 1 is a flowchart of a method for vertically positioning an examinee according to an embodiment of this application. As shown in FIG. 1, a sensor used to measure a distance to an examinee is attached to a CT device, and the method for vertically positioning an examinee includes the following steps:

S101. Obtain an initial position of an examination table of the CT device when horizontal placement of the examinee is completed.

S103. Obtain a measurement range of the sensor that is corresponding to a to-be-examined organ of the examinee and that is on the examination table, where the measurement range includes a start point and an end point in the horizontal direction.

S105. During movement of the examination table toward a scanner gantry of the CT device, when the start point reaches a measurement position of the sensor, cause the sensor to start measurement, and when the end point reaches the measurement position, stop measurement of the sensor, and obtain a real-time height of the examination table corresponding to the measurement range while the sensor performs measurement.

S107. Calculate an organ center height based on a measurement result of the distance to the examinee by the sensor, the height of the sensor, and the real-time height of the examination table corresponding to the measurement range, where the organ center height represents an average height of the center of the to-be-examined organ corresponding to the measurement range in the vertical direction.

S109. Adjust the height of the examination table based on the calculated organ center height, so that the adjusted organ center height is equal to the isocenter height of the scanner gantry.

In this manner, the vertical height of the examinee can be adjusted by using distance measurement of the sensor, so that the adjusted organ center height is equal to the isocenter height of the scanner gantry. Thus, the radiation dose to the examinee is minimized and CT imaging quality is improved.

Figure 2:
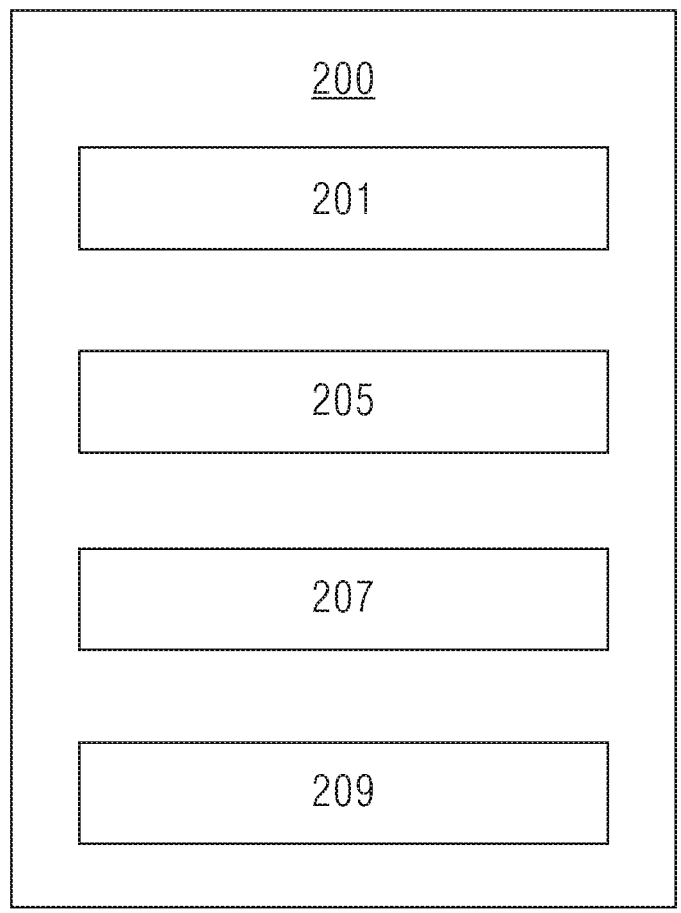
FIG. 2 is a schematic structural diagram of an apparatus for vertically positioning an examinee according to an exemplary embodiment of the disclosure.

FIG. 2 is a schematic structural diagram of an apparatus for vertically positioning an examinee according to an embodiment of this application. As shown in FIG. 2, an apparatus 200 for vertically positioning an examinee includes: an obtaining module 201, configured to: obtain an initial position of an examination table of the CT device from the CT device when horizontal placement of the examinee is completed; and obtain a measurement range that is corresponding to a to-be-examined organ of the examinee and that is on the examination table, where the measurement range includes a start point and an end point in the horizontal direction; a sensor 205, attached to a scanner gantry of the CT device, where a signal transmission direction of the sensor intersects an isocenter axis of the scanner gantry frame, and the sensor 205 is configured to: during movement of the examination table toward the scanner gantry, when the start point reaches a measurement position of the sensor, start to measure the distance to the examinee, and when the end point reaches the measurement position of the sensor, stop measurement, where the obtaining module 201 is further configured to obtain a real-time height of the examination table corresponding to the measurement range while the sensor performs measurement; a calculation module 207, configured to calculate an organ center height based on a measurement result of the sensor, the height of the sensor, and the real-time height of the examination table corresponding to the measurement range, where the organ center height represents an average height of the center of the to-be-examined organ corresponding to the measurement range in the vertical direction; and an adjustment module 209, configured to adjust the height of the examination table based on the calculated organ center height, so that the adjusted organ center height is equal to the isocenter height of the scanner gantry.

The apparatus 200 for vertically positioning an examinee shown in FIG. 2 is configured to perform the vertical positioning method shown in FIG. 1, and can implement an effect of minimizing the radiation dose to the examinee and improving CT imaging quality without affecting CT operation efficiency.

Figure 7:
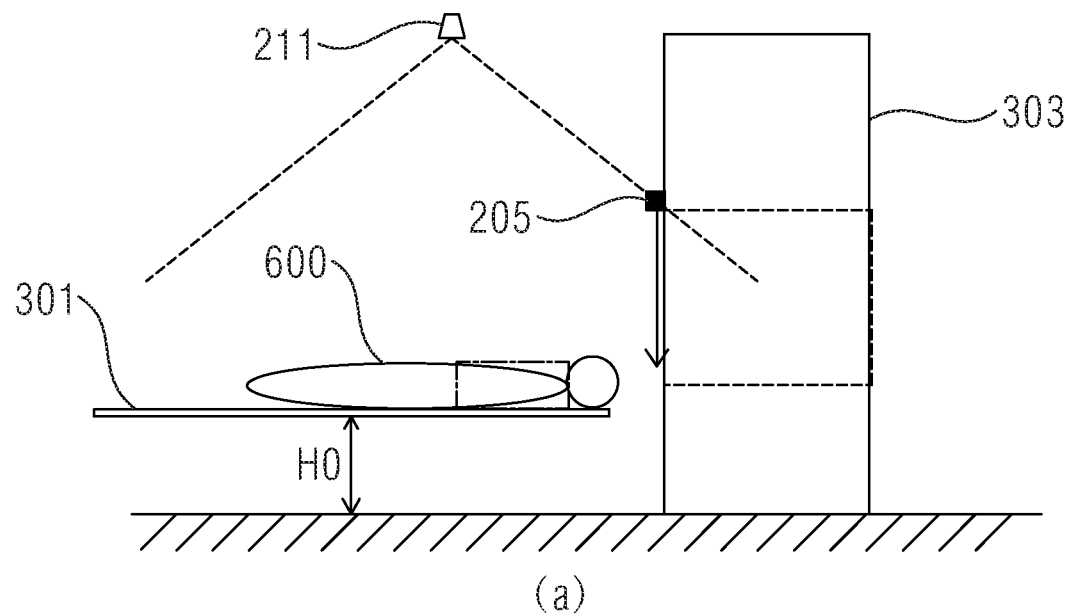
FIG. 7 is a schematic diagram of distance measurement performed on an examinee by using a time-of-flight sensor according to an exemplary embodiment of the disclosure.
Figure 7:
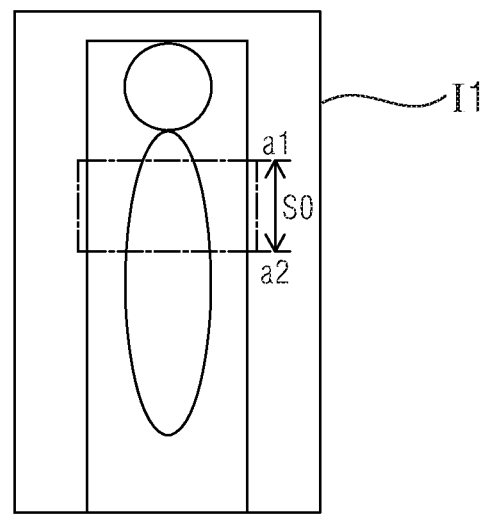

Further, according to an embodiment of this application, the apparatus 200 for vertically positioning an examinee may further include a camera 211 (as shown in FIG. 7), configured to shoot a top-view image of the examinee after the examinee is positioned on the examination table; and the obtaining module 201 is further configured to: determine an image range corresponding to the to-be-examined organ from the top-view image, where the image range is defined by pixel start coordinates and pixel end coordinates in the horizontal direction; map the pixel start coordinates to an initial position of the start point of the examination table based on an imaging parameter of the camera and the initial position of the examination table, and map the pixel end coordinates to an initial position of the end point of the examination table; and determine the measurement range from the start point and the end point.

Figure 3:
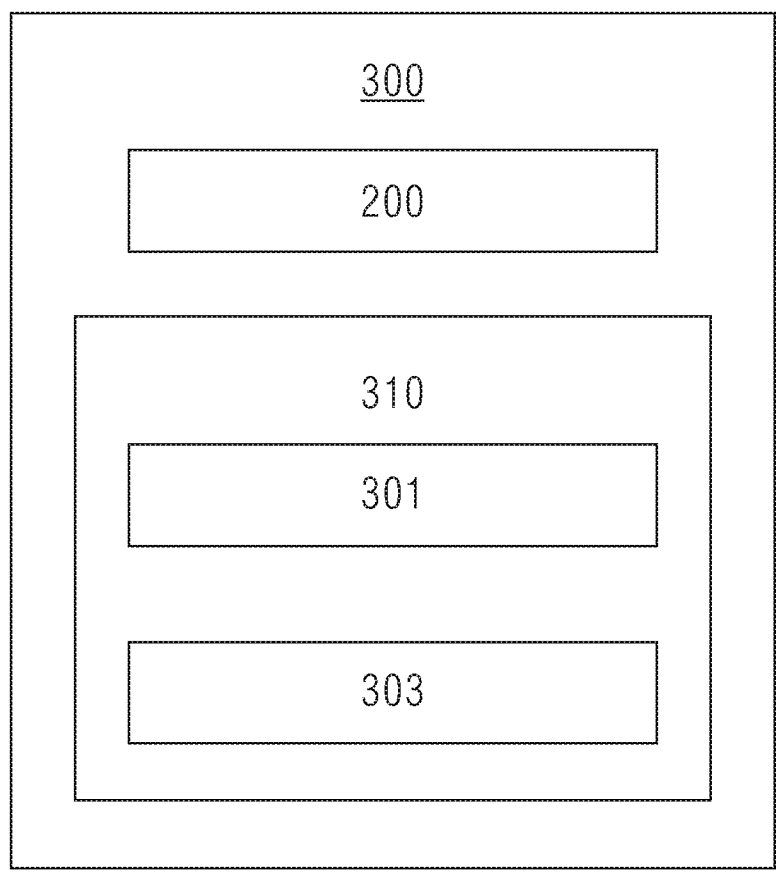
FIG. 3 is a schematic structural diagram of a CT system including an apparatus for vertically positioning an examinee according to an exemplary embodiment of the disclosure.

FIG. 3 is a schematic structural diagram of a CT system including an apparatus for vertically positioning an examinee according to an embodiment of this application. As shown in FIG. 3, a CT system 300 includes the apparatus 200 for vertically positioning an examinee shown in FIG. 2 and a CT device 310. The CT device 310 includes an examination table 301 capable of moving vertically under control of the apparatus 200 for vertically positioning an examinee; and a scanner gantry 303, configured to perform topo scanning or tomography scanning on an examinee 600 in the scanner gantry 303. A sensor 205 of the apparatus 200 for vertically positioning an examinee is attached to the scanner gantry 303, and a signal transmission direction of the sensor 205 intersects an isocenter axis Za of the scanner gantry 303.

The following specifically describes a method for vertically positioning an examinee, an apparatus for vertically positioning an examinee, and a CT system including the apparatus according to the embodiments of this application with reference to FIG. 4 to FIG. 10. In FIG. 4 to FIG. 10, the sensor 205 is a time-of-flight sensor, such as a time-of-flight laser radar sensor. However, a person skilled in the art will understand that another distance measurement sensor may be used.

Figure 4:
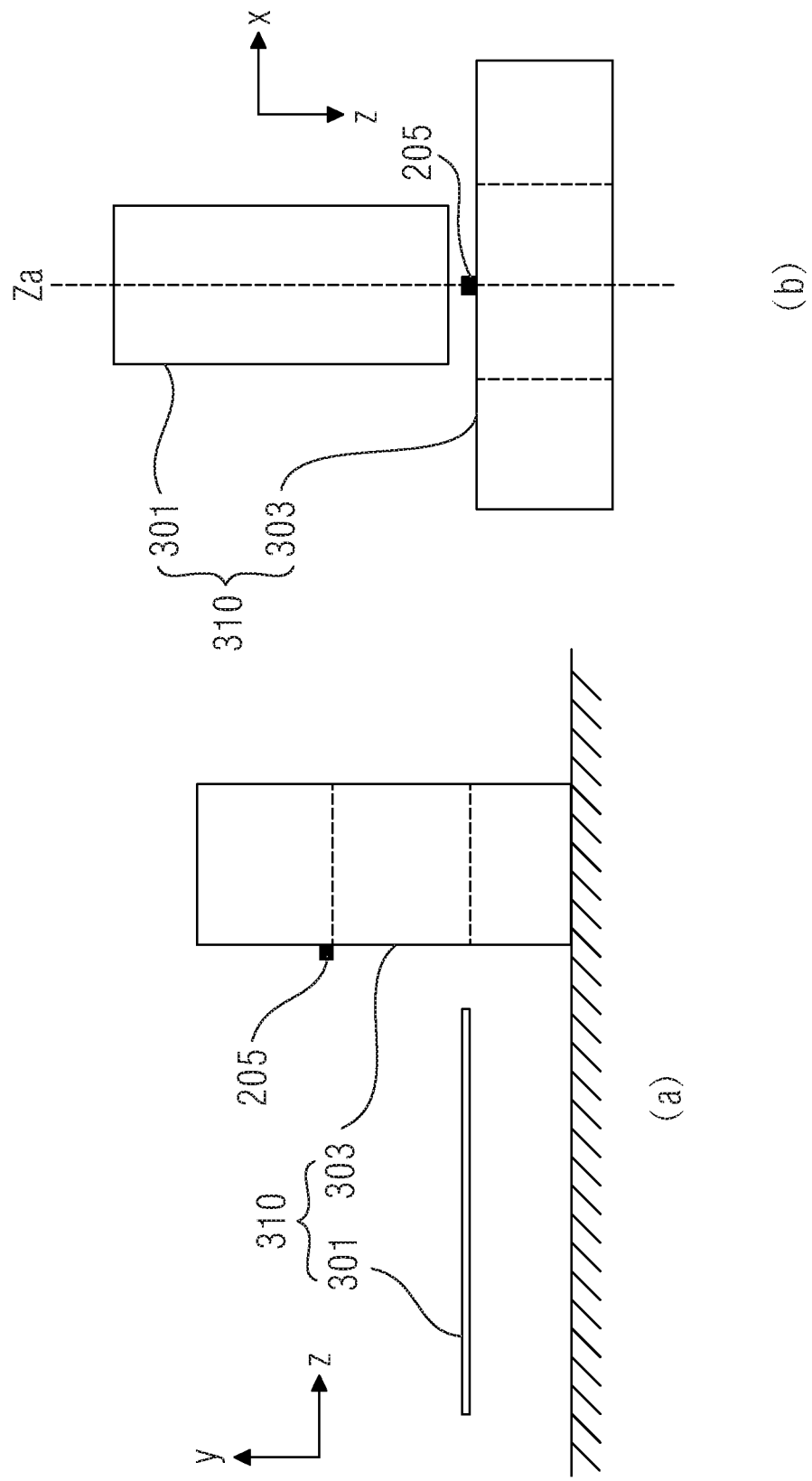
FIG. 4 is a schematic diagram of installing a sensor of an apparatus for vertically positioning an examinee to a CT scanner gantry according to an exemplary embodiment of the disclosure.

FIG. 4 is a schematic diagram of installing a time-of-flight sensor of an apparatus for vertically positioning an examinee to a CT scanner gantry according to an embodiment of this application. FIG. 4(a) shows a schematic side view of the CT device 310 and the time-of-flight sensor 205. An examination table 301 is arranged in the z direction. The time-of-flight sensor 205 is fixed on the scanner gantry 303 of the CT device 310 and is above the examination table 301 to measure the distance from the sensor to the examinee on the examination table 301 of the CT device. It should be noted that in the following, the horizontal movement direction of the examination table 301 is the z direction, the vertical (height) direction of the examination table 301 is the y direction, and the left and right directions of the examination table 301 is the x direction.

FIG. 4(b) shows the top view of the CT device 310 and the time-of-flight sensor 205, where a signal transmission direction of the time-of-flight sensor 205 intersects the isocenter axis Za of the scanner gantry 303 (the isocenter axis Za is positioned in the z direction and passes through the isocenter C of the scanner gantry, and x coordinates of Za coincide with x center coordinates of the examination table 301) to measure the distance to the examinee at the central position in the x direction on the examination table 301.

Figure 5:
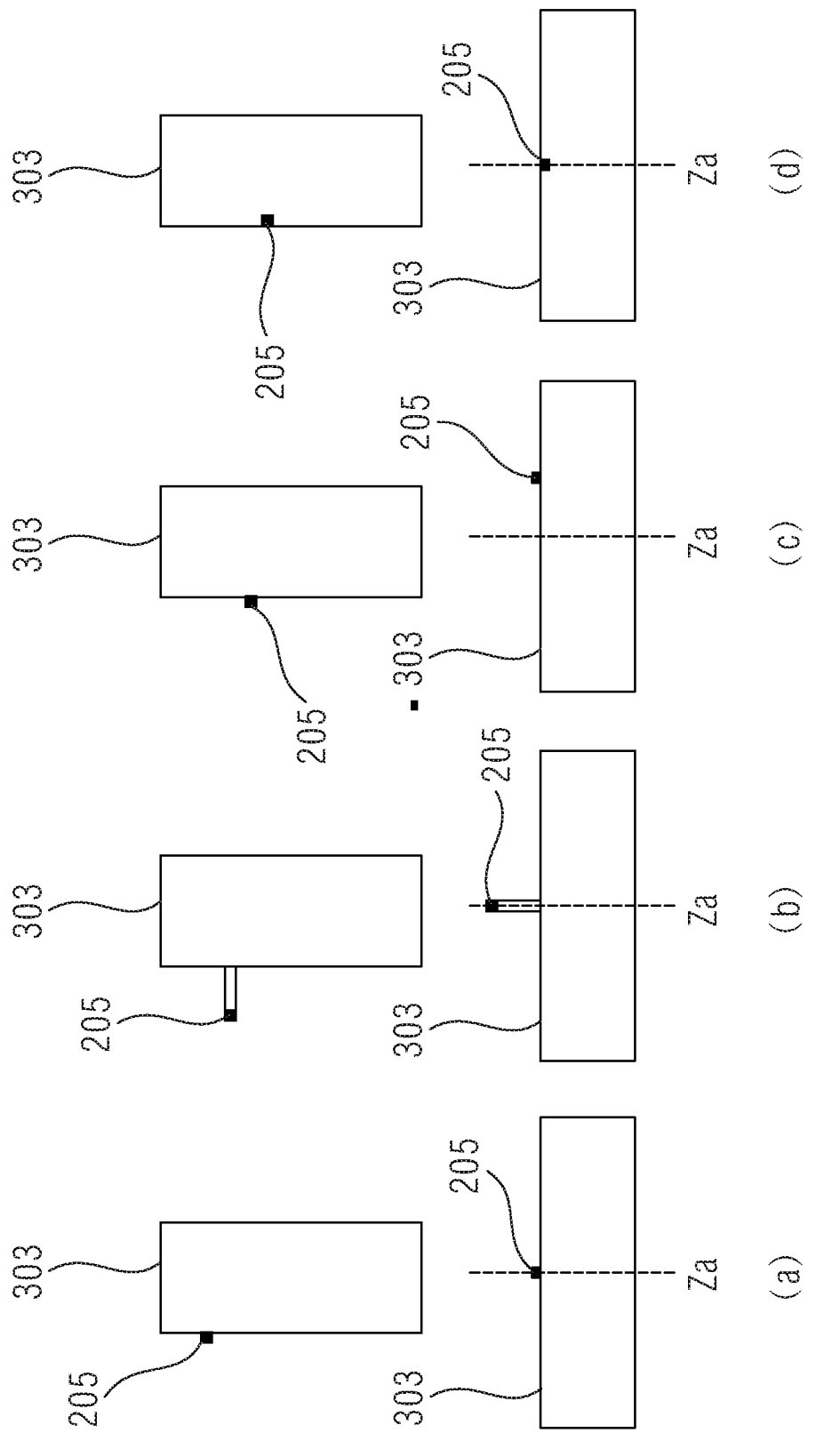
FIG. 5 is a schematic diagram of a plurality of installing positions of a sensor of an apparatus for vertically positioning an examinee on a CT scanner gantry according to an exemplary embodiment of the disclosure.

FIG. 5 is a schematic diagram of a plurality of installing positions of a time-of-flight sensor of an apparatus for vertically positioning an examinee on a CT scanner gantry according to an embodiment of this application. In each of FIG. 5(a) to FIG. 5(d), a side view of the scanner gantry 303 in the yz direction is shown in the upper part, and a side view of the scanner gantry 303 in the xz direction is shown in the lower part.

FIG. 5(a) shows a case in which the time-of-flight sensor 205 is installed in the upper center of the scanner gantry 303. The time-of-flight sensor 205 overlaps the x coordinates of the isocenter C of the scanner gantry 303 in the x direction, is positioned at a higher position of the scanner gantry 303 in the y direction, and is positioned at a position of the scanner gantry 303 closest to the outer surface of the examination table 301 in the z direction. In this case, the time-of-flight sensor 205 transmits a measurement signal (such as infrared laser) vertically downward to measure the distance to the examinee's body surface.

FIG. 5(b) shows a case in which the time-of-flight sensor 205 is installed outside the scanner gantry 303. A holder extends on the scanner gantry 303 in the z direction, and the time-of-flight sensor 205 is installed at an end portion of the holder. That is, compared with FIG. 5(a), in FIG. 5(b), the time-of-flight sensor 205 is closer to the examination table 301 in the z direction. In this case, the time-of-flight sensor 205 transmits a measurement signal vertically downward to measure the distance to the examinee's body surface.

FIG. 5(c) shows a case in which the time-of-flight sensor 205 is installed at an upper offset center position of the scanner gantry 303. Positions of the time-of-flight sensor 205 in the y and z directions are the same as those in FIG. 5(a), but the position thereof in the x direction is offset to the right from the position in FIG. 5(a). In this case, the time-of-flight sensor 205 transmits a measurement signal to the lower left, and the signal direction intersects the isocenter axis Za to measure the distance to the examinee's body surface.

FIG. 5(d) shows a case in which the time-of-flight sensor 205 is installed on an inner surface of the scanner gantry 303. In this case, the time-of-flight sensor 205 is installed on the inner surface of the annular scanner gantry 303. That is, compared with the case in FIG. 5(a), the height of the time-of-flight sensor 205 in the y direction decreases. In this case, the time-of-flight sensor 205 transmits a measurement signal vertically downward to measure the distance to the examinee's body surface.

Figure 6:
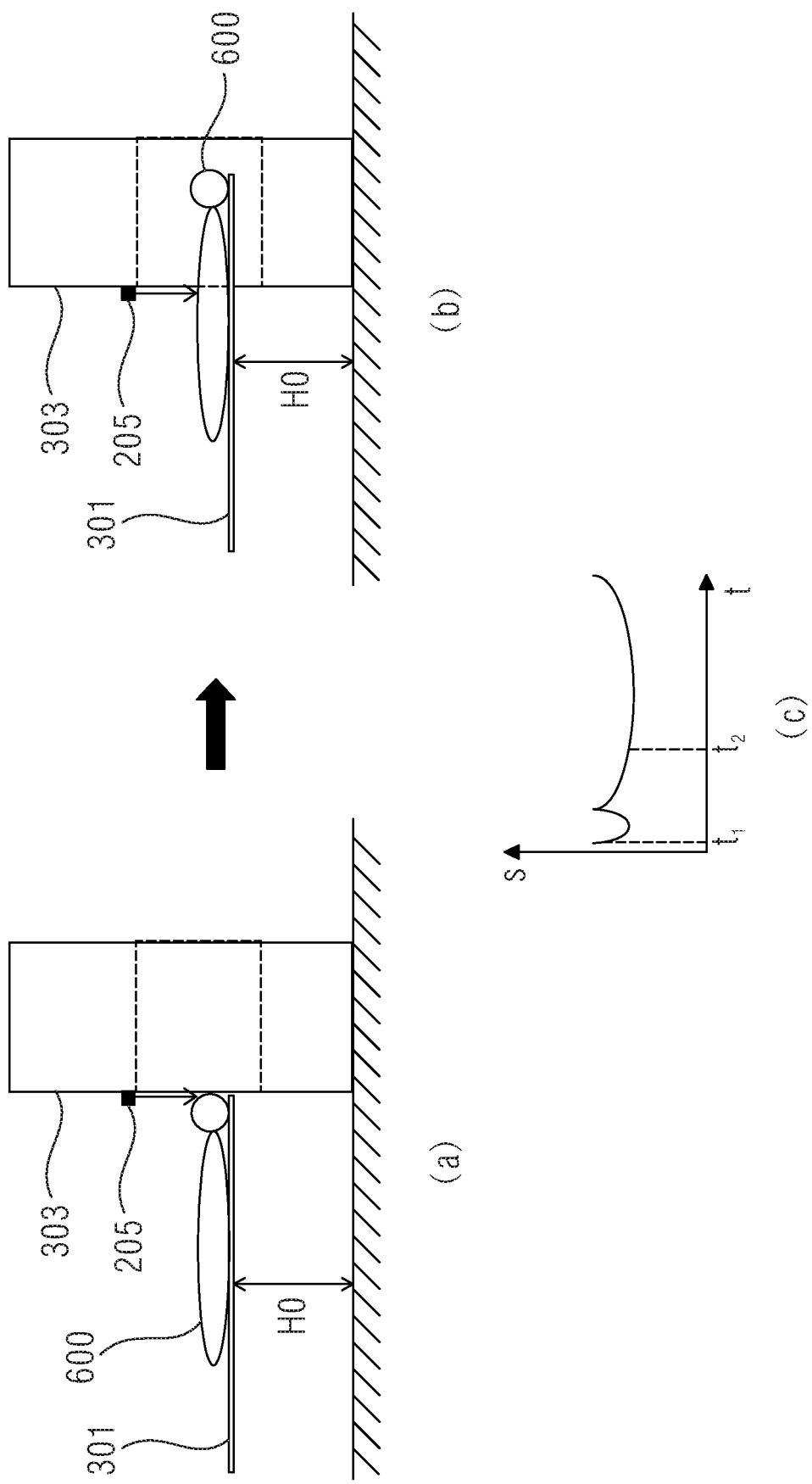
FIG. 6 is a schematic diagram of distance measurement performed on an examinee by using a time-of-flight sensor according to an exemplary embodiment of the disclosure.

FIG. 6 is a schematic diagram of distance measurement performed on an examinee by using a time-of-flight sensor according to an embodiment of this application. The position of the time-of-flight sensor 205 in FIG. 6 corresponds to the position shown in FIG. 5(a). As shown in FIG. 6(a), horizontal placement of the examinee 600 is completed on the examination table 301, where the examination table is at an initial height H0. While the examinee moves horizontally to the right with the examination table, the time-of-flight sensor 205 emits infrared light to measure the distance to the examinee 600 on the examination table 301, so as to obtain a distance profile curve for the examinee 600.

Specifically, as shown in FIG. 6(a), the examinee 600 moves to the right along with the examination table 301. The time-of-flight sensor 205 starts to measure the distance s to the examinee 600 in response that the examinee reaches the measurement position of the time-of-flight sensor 205 at a moment $t_1$ (shown directly below the sensor 205 in the figure). FIG. 6(b) shows the position of the examinee 600 at a moment $t_2$ after the moment $t_1$. In this case, the examinee 600 partly enters the scanner gantry 303 along with the examination table 301. The time-of-flight sensor 205 then continues to perform scanning until it receives a scanning end signal.

FIG. 6(c) shows the distance profile curve of the examinee obtained after the time-of-flight sensor 205 starts scanning at the moment $t_1$ and passes through the moment $t_2$ until the end of the scanning. The horizontal coordinate of the distance profile curve is a scanning time t, and the vertical coordinate s is a distance from the time-of-flight sensor 205 to the examinee 600 measured by the time-of-flight sensor 205.

Next, by using the measurement principle shown in FIG. 6, a method for adjusting the height of the examinee by using the time-of-flight sensor 205 in different embodiments that is controlled by the apparatus 200 for vertically positioning an examinee is described in detail with reference to FIG. 7 to FIG. 10. The apparatus 200 may be referred to as a controller in one or more aspects.

Figure 8:
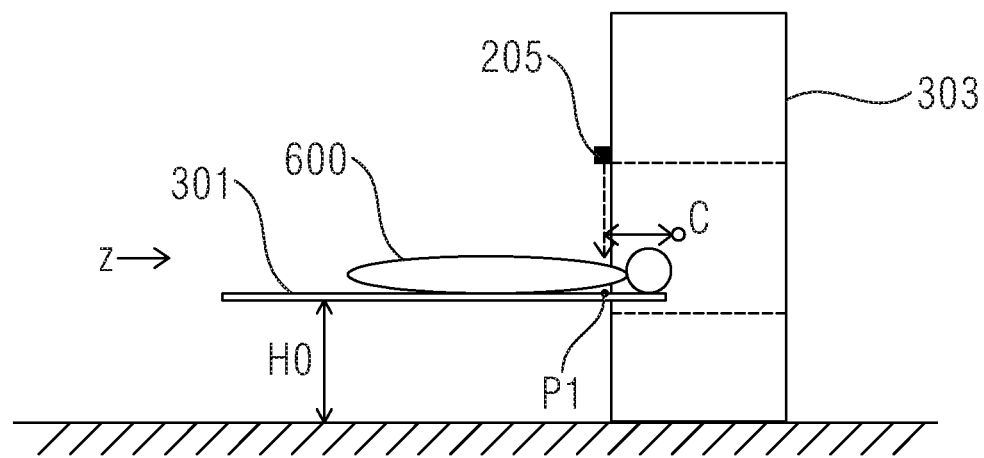
FIG. 8 is a schematic diagram of distance measurement performed on an examinee by using a time-of-flight sensor according to an exemplary embodiment of the disclosure.
Figure 8:
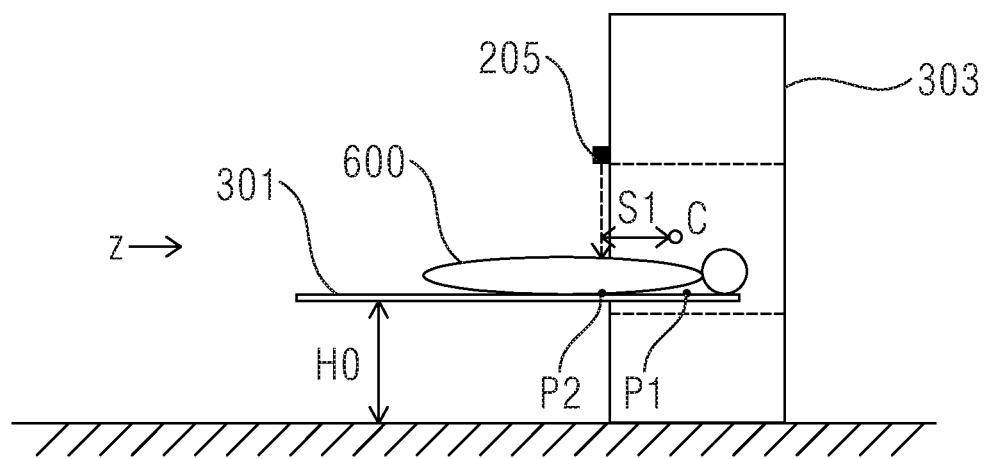
Figure 8:
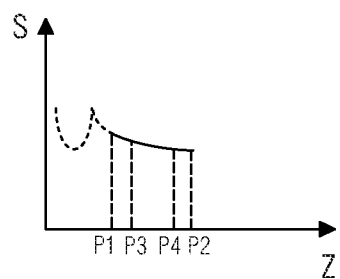
Figure 9:
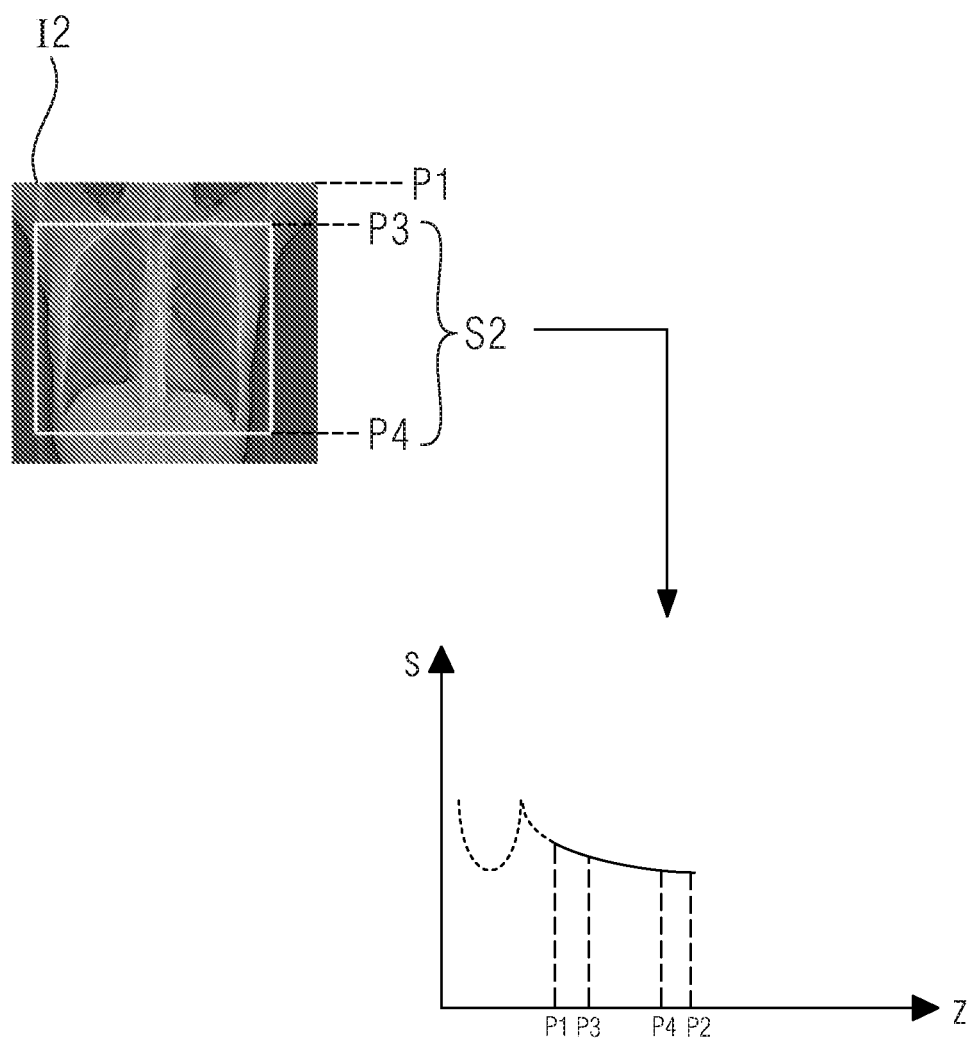
FIG. 9 is a schematic diagram of distance measurement performed on an examinee by using a time-of-flight sensor according to an exemplary embodiment of the disclosure.

It should be noted that the distance profile curve obtained in FIG. 7 to FIG. 9 differs from the distance profile curve shown in FIG. 6 in that the horizontal coordinates of the distance profile curve obtained in FIG. 7 to FIG. 9 are horizontal coordinates (that is, z coordinates) of the examination table 301, rather than the scanning time. In an embodiment, the z coordinates of the examination table 301 are represented by a horizontal distance between a fixed point on the examination table 301 (e.g., an endpoint in the upper right corner of the examination table 301) and the isocenter C of the scanner gantry 303.

FIG. 7 is a schematic diagram of distance measurement performed on an examinee by using a time-of-flight sensor according to a first example embodiment of this application. FIG. 7 shows a method for adjusting a height of an examinee by using a time-of-flight sensor 205 in combination with a camera 211, and the method is performed before topo scanning.

As shown in FIG. 7(a), the camera 211 is installed at a fixed position above an examination table 301 (for example, attached to a scanner gantry 303 at a specific distance), so that an imaging range of the camera 211 covers the entire examination table 301.

First, the examinee 600 is horizontally placed on the examination table 301. When horizontal placement is completed, the examination table 301 is at a preset initial height H0, and a horizontal position (a position in the z-direction) of the examination table 301 is known. For example, by setting the isocenter C (or another fixed point) of the scanner gantry 303 as the origin of the z direction, the horizontal position z of each point on the examination table 301 may be initially learned. In addition, the time-of-flight sensor 205 is at a fixed position, and its height Ht and horizontal position Zt are known. The height He and the horizontal position Zc of the isocenter C are also known.

Then, a top-view image I1 of the examinee 600 on the examination table 301 is shot by using the camera 211.

Next, an image range S0 (as shown in FIG. 7(b)) in which the time-of-flight sensor 205 performs measurement in the z direction is determined on the shot image I1 according to a to-be-examined organ (for example, the chest) of the examinee. The image range S0 is limited by start pixel coordinates a1 and end pixel coordinates a2 in the z direction on the image I1. Note that when required, the image range S0 may also be manually determined by an operator.

Then, the start pixel coordinates a1 and the end pixel coordinates a2 corresponding to the selected image range S0 are mapped to positions of coordinate points on the examination table 301 based on an imaging parameter of the camera 211, a distance from the camera 211 to the examination table 301, and the like. The positions of the mapped coordinate points are determined as a measurement start point P1 and a measurement end point P2 on the examination table 301. The measurement start point P1 and the measurement end point P2 define a measurement range S1 on the examination table 301.

Then, the examination table 301 is moved toward the scanner gantry 303.

During the movement of the examination table 301, in response to that the measurement start point P1 arrives at the measurement position of the time-of-flight sensor 205 (the response may be triggered based on time or distance; for example, the real-time z coordinates of the examination table 301 are obtained from the CT device, and measurement of the sensor 205 is triggered in response to that the z coordinates are changed to a specific value and the start point P1 is just below the time-of-flight sensor 205), the time-of-flight sensor 205 starts to measure the distance to the examinee 600. In response to that the measurement end point P2 reaches the measurement position of the time-of-flight sensor 205, the time-of-flight sensor 205 stops measurement. A real-time height H1 of the examination table 301 corresponding to the measurement range S1 is obtained while the time-of-flight sensor 205 performs measurement.

It should be noted that in this application, the height of the examination table 301 may change during movement of the examination table 301 toward the scanner gantry 303. Therefore, the real-time height H1 of the examination table 301 corresponding to each point in the measurement range S1 needs to be obtained while the time-of-flight sensor 205 performs measurement. The real-time height H1 of the examination table 301 may be obtained from the CT device. When the height of the examination table 301 remains unchanged during movement, only the initial height H0 of the examination table 301 needs to be obtained.

After measurement of the time-of-flight sensor 205 ends, a distance profile curve of the examinee 600 within the measurement range S1 is obtained based on the measurement result of the time-of-flight sensor 205. The profile curve indicates the distance s from the time-of-flight sensor 205 to the examinee 600 corresponding to each point from the measurement start point P1 to the measurement end point P2.

Based on the distance profile curve, the height Ht of the time-of-flight sensor 205, and the real-time height H1 of the examination table 301 corresponding to the measurement range S1, an organ center height H of the examinee 600 within the measurement range S1 may be calculated. The organ center height H represents the average height of the organ center corresponding to the measurement range S1 in the vertical direction (y direction). For example, the organ center height H is equal to the sum of a half of the average organ thickness and the current height H2 of the examination table 301. That is, the calculated organ center height H is the organ center height at the current moment.

For example, by subtracting the distance s corresponding to each point on the distance profile curve from the height Ht of the time-of-flight sensor 205, and subtracting the real-time height H1 of the examination table 301 corresponding to each point, thickness Ht−s−H1 of the organ of the examinee corresponding to each point from the measurement start point P1 to the measurement end point P2 may be obtained. All organ thickness of the examinee corresponding to all points may be averaged to obtain the average organ thickness Ha of the examinee within the measurement range S1. Therefore, at the current moment, the organ center height is H=Ha/2+H2.

After the organ center height H of the examinee 600 within the measurement range S1 is calculated, the calculated organ center height H may be compared with the isocenter height Hc of the scanner gantry 303. Because the organ center height H represents the average height of the central point of the to-be measured organ, it is desirable that the organ center height H is equal to the isocenter height Hc. In this case, the center of the to-be-examined organ overlaps the isocenter of the scanner gantry 303 in the y direction, so that the radiation dose to the examinee undergoing CT examination can be minimized and image quality of imaging can be improved.

When the calculated organ center height H is not equal to the isocenter height Hc, the height of the examination table 301 is adjusted, so that the adjusted organ center height H' is equal to the isocenter height Hc. For example, when the organ center height H<the isocenter height Hc, the height of the examination table 301 is increased by Hc−H; when the organ center height H>the isocenter height Hc, the height of the examination table 301 is reduced by H−Hc.

After the height of the examination table 301 is adjusted, the height of the center point of the to-be-examined organ coincides with the isocenter height of the scanner gantry 303. Then, the height of the examination table 301 remains unchanged, and topo scanning and tomography scanning are successively performed on the examinee 600.

FIG. 8 is a schematic diagram of distance measurement performed on an examinee by using a time-of-flight sensor according to a second example embodiment of this application. FIG. 8 shows a method for adjusting a height of an examinee by using only a time-of-flight sensor 205, and the method is performed before topo scanning.

The method shown in FIG. 8 is different from the method shown in FIG. 7 in that in FIG. 8, a camera is not used to determine an exact time-of-flight scanning range before measurement is performed by using the time-of-flight sensor 205.

First, the examinee 600 is horizontally placed on the examination table 301. When horizontal placement is completed, the examination table 301 is at a preset initial height H0, and a horizontal position (a position in the z-direction) of the examination table 301 is known. The time-of-flight sensor 205 is at a fixed position, and its height Ht and horizontal position Zt are known. The position (Zc, Hc) of the isocenter C of the scanner gantry 303 is known.

A measurement range S1 of the time-of-flight sensor 205 is determined according to a to-be-examined organ. The measurement range S1 may be predetermined according to the to-be-scanned organ. The measurement range S1 may be defined by a measurement start point P1 and a measurement end point P2 in the horizontal direction on the examinee 600 (or corresponding to the examination table). For simplicity, the horizontal distance (i.e., the scanning range) between the start point P1 and the measurement end point P2 is also represented by S1.

In an example embodiment, the measurement start point P1 is determined by a topo scanning start point. That is, a topo scanning range corresponding to the to-be-examined organ is obtained from a CT device, and the topo scanning range is pre-stored by the CT device. The topo scanning range includes a topo scanning start point and a topo scanning end point on the examination table 301 in the horizontal direction. The topo scanning start point is determined as the measurement start point P1 of the time-of-flight sensor 205, as shown in FIG. 8(a).

In an example embodiment, the measurement end point P2 is determined by a topo scanning end point. That is, the horizontal position of the measurement end point P2=the horizontal position of the topo scanning start point−(Zc−Zt). In this manner, when the examinee moves to the topo scanning start position (that is, when the topo scanning start point reaches the isocenter C of the scanner gantry 303), the measurement end point P2 exactly reaches the measurement position of the time-of-flight sensor 205, as shown in FIG. 8(b). In this way, when the examinee 600 moves to the topo scanning start position, measurement of the time-of-flight sensor 205 ends exactly, and then topo scanning may be directly started without additional movement of the examination table 301.

However, it should be noted that the measurement start point P1 and the measurement end point P2 are only examples, and any measurement range S1 corresponding to the to-be-examined organ may be determined.

After the measurement range S1 is determined, the examination table 301 is moved toward the scanner gantry 303.

As shown in FIG. 8(a), the time-of-flight sensor 205 starts to measure the distance to the examinee 600 in response to that the measurement start point P1 reaches the measurement position of the time-of-flight sensor 205. The response may be triggered based on time or distance. Alternatively, the measurement start point P1 is positioned exactly below the time-of-flight sensor 205 when the examinee 600 is placed horizontally. In this case, the time-of-flight sensor 205 starts to perform measurement while the scanner gantry 303 starts moving.

As shown in FIG. 8(b), in response to that the measurement end point P2 reaches the measurement position of the time-of-flight sensor 205, the time-of-flight sensor 205 stops measurement. During measurement by the time-of-flight sensor 205, a real-time height H1 of the examination table 301 corresponding to the measurement range S1 is obtained.

As shown in FIG. 8(c), based on the measurement result of the time-of-flight sensor 205, a distance profile curve of the examinee 600 within the measurement range S1 is obtained. The profile curve indicates the distance s from the time-of-flight sensor 205 to the examinee 600 corresponding to each point from the measurement start point P1 to the measurement end point P2.

A calculation range S2 is selected from the distance profile curve. The calculation range S2 is defined by a calculation start point P3 and a calculation end point P4, and the calculation start point P3 and the calculation end point P4 are positioned between the measurement start point P1 and the measurement end point P2. The distance between the calculation start point P3 and the calculation end point P4 is also represented by S2. Generally, $0.5S1 < S2 \leq S1$.

Based on the selected calculation range S2, an updated distance profile curve is obtained, which indicates a distance s from the time-of-flight sensor 205 to the examinee 600 corresponding to each point from the calculation start point P3 to the calculation end point P4.

Then, similar to the steps of the method shown in FIG. 7, based on the updated distance profile curve, the height Ht of the time-of-flight sensor 205, and the real-time height H1 of the examination table 301 corresponding to the calculation range S2 within the measurement range S1, an organ center height H of the examinee 600 within the calculation range S2 is calculated.

Next, the calculated organ center height H is compared with the isocenter height Hc of the scanner gantry 303. When the calculated organ center height H is not equal to the isocenter height Hc, the height of the examination table 301 is adjusted, so that the adjusted organ center height H' is equal to the isocenter height Hc.

After the height of the examination table 301 is adjusted, topo scanning and tomography scanning are successively performed on the examinee 600.

FIG. 9 is a schematic diagram of distance measurement performed on an examinee by using a time-of-flight sensor according to a third example embodiment of this application. FIG. 9 shows a method for adjusting a height of an examinee by using only a time-of-flight sensor 205, and in this method, a measurement period of the time-of-flight sensor 205 partly coincides with a time period of topo scanning.

First, the examinee 600 is horizontally placed on the examination table 301. When horizontal placement is completed, the examination table 301 is at a preset initial height H0, and a horizontal position (a position in the z-direction) of the examination table 301 is known. The time-of-flight sensor 205 is at a fixed position, and its height Ht and horizontal position Zt are known. The position (Zc, Hc) of the isocenter C of the scanner gantry 303 is known.

Then, a topo scanning range of topo scanning of the CT device corresponding to a to-be-examined organ is obtained, and a measurement range S1 of the time-of-flight sensor 205 is determined based on the topo scanning range. The topo scanning range is pre-stored in the Corresponding to machine. The topo scanning range includes a topo scanning start point and a topo scanning end point on the examination table 301 in the horizontal direction. In this embodiment, the measurement range S1 includes the topo scanning range.

In an example embodiment, a measurement start point P1 of the measurement range S1 is determined by the topo scanning start point. For example, the topo scanning start point is determined as the measurement start point P1. In this case, measurement of the time-of-flight sensor 205 starts earlier than topo scanning.

In an example embodiment, the measurement end point P2 of the measurement range S1 is determined by the topo scanning end point. For example, the horizontal position of the measurement end point P2=the horizontal position of the topo scanning end point−(Zc−Zt). In this way, when the examinee 600 moves to the topo scanning end position (that is, the topo scanning end point reaches the isocenter C of the scanner gantry 303), the measurement end point P2 exactly reaches the measurement position of the time-of-flight sensor 205. In this way, when topo scanning ends, measurement of the time-of-flight sensor 205 ends at the same time.

After the measurement range S1 is determined, the examination table 301 is moved toward the scanner gantry 303. Similar to the steps in FIG. 8, the time-of-flight sensor 205 measures a distance to the examinee 600 for the measurement range S1, and obtains a distance profile curve corresponding to the measurement range S1 (as shown in the lower part of FIG. 9). The profile curve indicates the distance s from the time-of-flight sensor 205 to the examinee 600 corresponding to each point from the measurement start point P1 to the measurement end point P2. In addition, a detector in the scanner gantry 303 performs topo scanning on the examinee 600 to generate a topo image I2 corresponding to the topo scanning range. During measurement by the time-of-flight sensor 205, a real-time height H1 of the examination table 301 corresponding to the measurement range S1 is further obtained from the CT device 310.

Then, a calculation range S2 is obtained, or the topo image I2 and the calculation range S2 (the calculation range S2 is within the topo scanning range) are obtained. The calculation range S2 is defined by a calculation start point P3 and a calculation end point P4 in the horizontal direction.

In an example embodiment, the calculation range S2 is obtained from the CT device 310. That is, the calculation range is a tomography scanning range in the horizontal direction determined by the CT device 310, and the tomography scanning range is determined by the CT device 310 from the topo image I2 generated by topo scanning, and is within the topo scanning range. Because the measurement range S1 includes the topo scanning range, the calculation start point P3 and the calculation end point P4 of the calculation range S2 are necessarily positioned between the measurement start point P1 and the measurement end point P2. For simplicity, the distance between the calculation start point P3 and the calculation end point P4 is also represented by S2. Generally, $0.5S1 < S2 \leq S1$.

Based on the obtained calculation range S2, an updated profile curve is determined from the measured profile curve, and the updated profile curve indicates a distance from the sensor 205 to the examinee 600 corresponding to each point in the calculation range S2 (that is, each point from the calculation start point P3 to the calculation end point P4).

Then, similar to the steps of the method shown in FIG. 7, based on the updated profile curve, the height Ht of the time-of-flight sensor 205, and the real-time height H1 of the examination table 301 corresponding to the calculation range S2 within the measurement range S1, an organ center height H of the examinee 600 within the calculation range S2 is calculated.

The calculated organ center height H is compared with the isocenter height Hc of the scanner gantry 303. When the calculated organ center height H is not equal to the isocenter height Hc, the height of the examination table 301 is adjusted, so that the adjusted organ center height H' is equal to the isocenter height Hc.

After the height of the examination table 301 is adjusted, tomography scanning is performed on the examinee.

Figure 10:
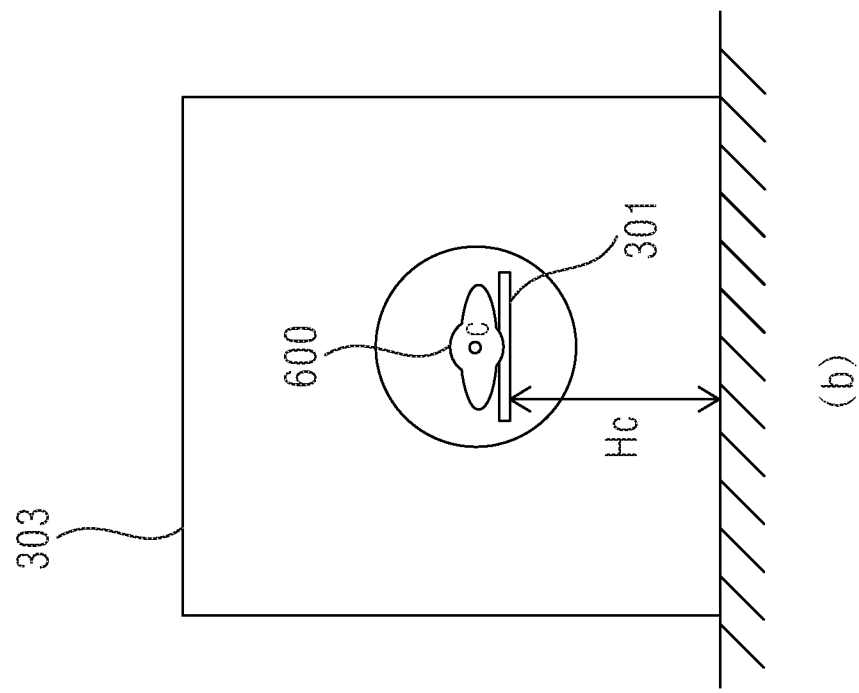
FIG. 10 is a schematic diagram of height adjustment performed on an examinee after distance measurement is performed by using a time-of-flight sensor according to an exemplary embodiment of the disclosure.
Figure 10:
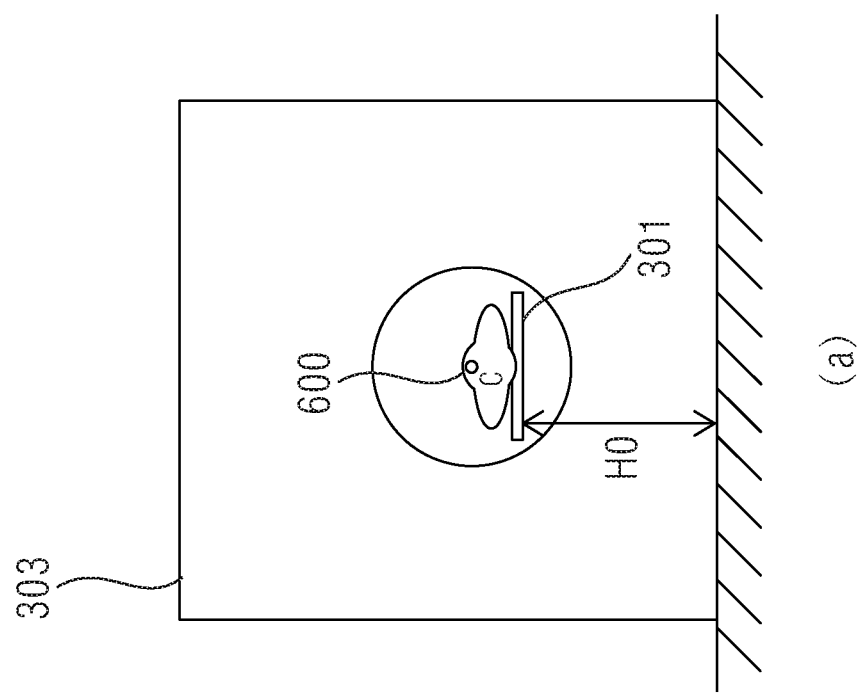

FIG. 10 is a schematic diagram of height adjustment performed on an examinee after distance measurement is performed by using a time-of-flight sensor according to an embodiment of this application.

As shown in FIG. 10(a), before a time-of-flight sensor 205 measures an examinee 600, an examination table 301 is at an initial height H0. The initial height H0 is a preset value.

As shown in FIG. 10(b), after height measurement and adjustment are performed on the examinee 600 by using the time-of-flight sensor 205 with reference to the methods of FIG. 7 to FIG. 9, the examination table 301 is adjusted to an optimized height H'. In this case, the height H' overlaps with the isocenter C of the scanner gantry 303 in the y direction, that is, H'=Hc.

It should be noted that time-of-flight sensors 205 used in the foregoing descriptions with reference to FIG. 7 to FIG. 10 are all single time-of-flight sensors that transmit a single measurement signal such as infrared light to the examinee 600. A person skilled in the art can understand that the time-of-flight sensor 205 may also include a plurality of time-of-flight sensors. The plurality of time-of-flight sensors may form a row of time-of-flight sensors or an array of time-of-flight sensors.

It should be noted that by using the method for vertically positioning an examinee described with reference to FIG. 7 to FIG. 10, a deviation distance between the vertical center of a to-be-examined organ of the examinee and the isocenter C of the CT scanner gantry 303 may be reduced at least to be less than 20 mm. When a high-precision camera or a high-precision time-of-flight sensor is used, an offset between the vertical center of the organ and the isocenter C of the scanner gantry 303 may be further reduced.

Apparently, the described embodiments are only some embodiments rather than all the embodiments of this application. All other embodiments obtained by a person of ordinary skill in the art based on the embodiments of this application without creative efforts shall fall within the protection scope of this application.

It should be noted that terms used herein are only for describing specific embodiments and are not intended to limit exemplary embodiments according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

In the specification, claims, and the foregoing accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein.

The above descriptions are merely preferred embodiments of this application and are not intended to limit this application. For those skilled in the art, this application may have various modifications and changes. Any modification, equivalent replacement, or improvement made without departing from the spirit and principle of this application shall fall within the protection scope of this application.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules," "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, units, or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

200: Apparatus for vertically positioning an examinee
201: Obtaining module
205: Sensor
207: Calculation module
209: Adjustment module
211: Camera
300: CT system
310: CT device
301: Examination table
303: Scanner gantry
600: Examinee
C: Isocenter of the scanner gantry
Za: Isocenter axis of the scanner gantry
I1: Top-view image of an examinee shot by the camera
I2: Topo image generated by topo scanning of the CT device
S0: Image range determined on the top-view image shot by the camera
a1: Start pixel coordinates of the image range
b1: End pixel coordinates of the image range
S1: Measurement range of a time-of-flight sensor
P1: Start point of the measurement range
P2: End point of the measurement range
S2: Calculation range
P3: Start point of the calculation range
P4: End point of the calculation range

What is claimed is:

1. A method for vertically positioning an examinee on a computed tomography (CT) device, the method comprising:
obtaining an initial position of an examination table of the CT device when horizontal placement of the examinee is completed;
obtaining a measurement range of a sensor that is corresponding to a to-be-examined organ of the examinee and that is on the examination table, the sensor attached to the CT device and being configured to measure a distance to the examinee, wherein the measurement range comprises a start point and an end point in a horizontal direction;
during movement of the examination table toward a scanner gantry of the CT device, in response to the start point reaching a measurement position of the sensor, causing the sensor to start measurement, and in response to the end point reaching the measurement position, stopping measurement of the sensor, and obtaining a real-time height of the examination table corresponding to the measurement range while the sensor performs measurement;
calculating an organ center height based on a measurement result of the distance to the examinee by the sensor, the height of the sensor, and the real-time height of the examination table corresponding to the measurement range, wherein the organ center height represents an average height of a center of the to-be-examined organ corresponding to the measurement range in the vertical direction; and
adjusting the height of the examination table based on the calculated organ center height such that an adjusted organ center height is equal to an isocenter height of the scanner gantry.

2. The method for vertically positioning an examinee on a CT device according to claim 1, wherein the calculating the organ center height comprises:
calculating average organ thickness of the examinee corresponding to the measurement range based on the measurement result of the sensor, the height of the sensor, and the real-time height of the examination table corresponding to the measurement range, and
calculating the organ center height based on the average organ thickness and a current height of the examination table.

3. The method for vertically positioning an examinee on a CT device according to claim 1, wherein the obtaining the measurement range of the sensor comprises:
obtaining a top-view image of the examinee from a camera;
determining an image range corresponding to the to-be-examined organ from the top-view image, wherein the image range is defined by pixel start coordinates and pixel end coordinates in the horizontal direction;
mapping the pixel start coordinates to an initial position of the start point of the examination table based on an imaging parameter of the camera and the initial position of the examination table, and mapping the pixel end coordinates to an initial position of the end point of the examination table; and
determining the measurement range from the start point and the end point.

4. The method for vertically positioning an examinee on a CT device according to claim 1, wherein the calculating the organ center height, based on a measurement result of the sensor, the height of the sensor, and the real-time height of the examination table corresponding to the measurement range, comprises:
obtaining a distance profile curve from the measurement result of the sensor, wherein the distance profile curve indicates a distance from the sensor to the examinee corresponding to each point in the measurement range; and
calculating the organ center height corresponding to the measurement range based on the distance profile curve, the height of the sensor, and the real-time height of the examination table corresponding to the measurement range.

5. The method for vertically positioning an examinee on a CT device according to claim 1, wherein the obtaining a measurement range of the sensor that is corresponding to a to-be-examined organ of the examinee and that is on the examination table comprises:
obtaining a topography scanning range of topography scanning of the CT device, wherein the topography scanning range is determined by the CT device for the to-be-examined organ, and the topography scanning range comprises a scanning start point and a scanning end point of the examination table in the horizontal direction; and determining the measurement range based on the obtained topography scanning range.

6. The method for vertically positioning an examinee on a CT device according to claim 5, wherein the determining the measurement range based on the obtained topography scanning range comprises: determining the start point and the end point of the measurement range based on the scanning start point of the topography scanning range.

7. The method for vertically positioning an examinee on a CT device according to claim 6, wherein a distance between the start point and the end point is equal to a distance between the sensor and the isocenter of the scanner gantry in the horizontal direction.

8. The method for vertically positioning an examinee on a CT device according to claim 5, wherein the calculating the organ center height comprises:

obtaining a distance profile curve based on the measurement result of the sensor, the distance profile curve being indicative of a distance from the sensor to the examinee corresponding to each point in the measurement range;

determining a calculation range corresponding to the to-be-examined organ based on the distance profile curve, wherein the calculation range is within the measurement range;

determining an updated profile curve based on the calculation range, wherein the updated profile curve being indicative of a distance from the sensor to the examinee corresponding to each point in the calculation range; and calculating the organ center height corresponding to the measurement range based on the updated profile curve, the height of the sensor, and the real-time height of the examination table corresponding to the calculation range within the measurement range.

9. The method for vertically positioning an examinee on a CT device according to claim 5, wherein the determining the measurement range based on the obtained topography scanning range comprises:

determining the start point of the measurement range based on the scanning start point of the topography scanning range, and determining the end point of the measurement range based on the scanning end point of the topography scanning range, the measurement range including the topography scanning range.

10. The method for vertically positioning an examinee on a CT device according to claim 9, wherein the calculating an organ center height comprises:

obtaining a distance profile curve based on the measurement result of the sensor, the distance profile curve being indicative of a distance from the sensor to the examinee corresponding to each point in the measurement range;

obtaining a calculation range from the CT device, wherein the calculation range is a tomography scanning range in the horizontal direction determined by the CT device, and the tomography scanning range is determined by the CT device from a topography image generated by the topography scanning and is within the topography scanning range;

determining an updated profile curve based on the calculation range from the distance profile curve, the updated profile curve being indicative of a distance from the sensor to the examinee corresponding to each point in the calculation range; and calculating the organ center height corresponding to the measurement range based on the updated profile curve, the height of the sensor, and the real-time height of the examination table corresponding to the calculation range within the measurement range.

11. An apparatus for vertically positioning an examinee on a computed tomography (CT) device, comprising:

an obtaining module configured to obtain: an initial position of an examination table of the CT device from the CT device when horizontal placement of the examinee is completed, and a measurement range that is corresponding to a to-be-examined organ of the examinee and that is on the examination table, wherein the measurement range comprises a start point and an end point in the horizontal direction;

a sensor attached to a scanner gantry of the CT device, a signal transmission direction of the sensor intersecting an isocenter axis of the scanner gantry frame, wherein the sensor is configured to: during movement of the examination table toward the scanner gantry, when the start point reaches a measurement position of the sensor, start to measure the distance to the examinee, and when the end point reaches the measurement position, stop measurement, wherein the obtaining module is further configured to obtain a real-time height of the examination table corresponding to the measurement range while the sensor performs measurement;

a calculation module configured to calculate an organ center height based on a measurement result of the sensor, the height of the sensor, and the real-time height of the examination table corresponding to the measurement range, wherein the organ center height represents an average height of the center of the to-be-examined organ corresponding to the measurement range in the vertical direction; and an adjustment module configured to adjust the height of the examination table based on the calculated organ center height such that an adjusted organ center height is equal to an isocenter height of the scanner gantry.

12. The apparatus for vertically positioning an examinee on a CT device according to claim 11, wherein calculating an organ center height comprises:

calculating average organ thickness of the examinee corresponding to the measurement range based on the measurement result of the sensor, the height of the sensor, and the real-time height of the examination table corresponding to the measurement range; and calculating the organ center height based on the average organ thickness and the current height of the examination table.

13. The apparatus for vertically positioning an examinee on a CT device according to claim 11, further comprising: a camera configured to shoot a top-view image of the examinee when horizontal placement of the examinee is completed, wherein the obtaining module is further configured to:

obtain the top-view image and determine an image range corresponding to the to-be-examined organ from the top-view image, the image range being defined by pixel start coordinates and pixel end coordinates in the horizontal direction;

map the pixel start coordinates to an initial position of the start point of the examination table based on an imaging parameter of the camera and the initial position of the examination table, and map the pixel end coordinates to an initial position of the end point of the examination table; and determine the measurement range from the start point and the end point.

14. The apparatus for vertically positioning an examinee on a CT device according to claim 11, wherein the calculation module is further configured to:
 determine a distance profile curve based on the measurement result of the sensor, wherein the distance profile curve indicates a distance from the sensor to the examinee corresponding to each point in the measurement range; and
 calculate the organ center height corresponding to the measurement range based on the distance profile curve, the height of the sensor, and the real-time height of the examination table corresponding to the measurement range.

15. The apparatus for vertically positioning an examinee on a CT device according to claim 11, wherein the obtaining module is further configured to:
 obtain a topography scanning range of topography scanning from the CT device, wherein the topography scanning range is determined by the CT device for the to-be-examined organ, and the topography scanning range comprises a scanning start point and a scanning end point of the examination table in the horizontal direction; and
 determine the measurement range based on the obtained topography scanning range.

16. The apparatus for vertically positioning an examinee on a CT device according to claim 15, wherein the determining the measurement range based on the obtained topography scanning range comprises: determining the start point and the end point of the measurement range based on the scanning start point of the topography scanning range.

17. The apparatus for vertically positioning an examinee on a CT device according to claim 16, wherein a distance between the start point and the end point is equal to a distance between the sensor and the isocenter of the scanner gantry in the horizontal direction.

18. The apparatus for vertically positioning an examinee on a CT device according to claim 15, wherein the calculation module is further configured to:
 determine a distance profile curve from the measurement result of the sensor, wherein the distance profile curve indicates a distance from the sensor to the examinee corresponding to each point in the measurement range;
 determine a calculation range corresponding to the to-be-examined organ based on the distance profile curve, wherein the calculation range is within the measurement range;
 determine an updated profile curve based on the calculation range, wherein the updated profile curve indicates a distance from the sensor to the examinee corresponding to each point in the calculation range; and
 calculate the organ center height corresponding to the measurement range based on the updated profile curve, the height of the sensor, and the real-time height of the examination table corresponding to the calculation range within the measurement range.

19. The apparatus for vertically positioning an examinee on a CT device according to claim 15, wherein the obtaining module is further configured to:
 determine the start point of the measurement range based on the scanning start point of the topography scanning range; and
 determine the end point of the measurement range based on the scanning end point of the topography scanning range, wherein the measurement range comprises the topography scanning range.

20. The apparatus for vertically positioning an examinee on a CT device according to claim 19, wherein the obtaining module is further configured to:
 obtain a calculation range from the CT device, wherein the calculation range is a tomography scanning range in the horizontal direction determined by the CT device, and the tomography scanning range is determined by the CT device from a topography image generated by the topography scanning and is within the topography scanning range; and the calculation module is further configured to:
 determine a distance profile curve from the measurement result of the sensor, wherein the distance profile curve indicates a distance from the sensor to the examinee corresponding to each point in the measurement range;
 determine an updated profile curve based on the calculation range from the distance profile curve, wherein the updated profile curve indicates a distance from the sensor to the examinee corresponding to each point in the calculation range; and
 calculate the organ center height corresponding to the measurement range based on the updated profile curve, the height of the sensor, and the real-time height of the examination table corresponding to the calculation range within the measurement range.

21. The apparatus for vertically positioning an examinee on a CT device according to claim 11, wherein the sensor comprises a single sensor unit or an array comprising a plurality of sensor units.

22. A computed tomography (CT) system, comprising:
 the apparatus for vertically positioning an examinee according to claim 11; and
 a CT device comprising:
  an examination table configured to move vertically under control of the apparatus to vertically position an examinee; and
  a scanner gantry, configured to perform topography scanning or tomography scanning on the examinee in the scanner gantry, wherein the sensor of the apparatus is attached to the scanner gantry, a signal transmission direction of the sensor intersecting an isocenter axis of the scanner gantry.

* * * * *